United States Patent [19]
Ubukata et al.

[11] Patent Number: 6,158,023
[45] Date of Patent: Dec. 5, 2000

[54] DEBUG APPARATUS

[75] Inventors: Atsushi Ubukata, Kyoto; Shinya Miyaji, Osaka, both of Japan

[73] Assignee: Matsushita Electric Industrial Co., Ltd., Osaka, Japan

[21] Appl. No.: 09/084,511

[22] Filed: May 26, 1998

[30]    Foreign Application Priority Data

May 28, 1997   [JP]   Japan .................................... 9-138139

[51] Int. Cl.⁷ .......................... G06F 13/00; G06F 11/30
[52] U.S. Cl. .............................. 714/35; 714/34; 714/38; 714/32; 714/47; 714/48
[58] Field of Search ................................ 714/34, 35, 32, 714/38, 47, 48; 395/704; 712/227, 228

[56]          References Cited

U.S. PATENT DOCUMENTS 5,740,413   4/1998   Alpert et al. ............................. 395/568
6,065,078   5/2000   Falik et al. ............................... 710/100

FOREIGN PATENT DOCUMENTS

4-130930   5/1992   Japan .
5-66965    3/1993   Japan .

*Primary Examiner*—Robert W. Beausoliel, Jr.
*Assistant Examiner*—James G. Weir
*Attorney, Agent, or Firm*—Merchant & Gould P.C.

[57]          ABSTRACT

The present invention provides a debug apparatus that can set complex break conditions, minimize a time lag from the detection of a break event to the break an execution of a program, and has a debug function with a necessary minimized break determinator included in a chip. A part of the break conditions in a sequence is set in an external break determinator. The remaining condition other than the part of the conditions is set in an internal break determinator. While monitoring an operation status of a processor executing a program, when the conditions set in the external break determinator are satisfied, a break enable signal is input to an AND logic circuit via a break enable input terminal and is held. When the break determinator detects the satisfaction of the remaining condition stored in the internal break determinator, a break signal is supplied from the AND logic circuit to the CPU, thereby breaking the program without delay.

10 Claims, 10 Drawing Sheets

Prior Art

Fig.7

Prior Art

DEBUG APPARATUS

BACKGROUND OF THE INVENTION

1. Field of the Invention

The present invention relates to a debug apparatus having a breakpoint setting function for program debugging.

2. Description of the Prior Art

A program is generally debugged by interrupting (breaking) the execution of the program when preset conditions concerning address data of memory access, execution addresses or the like are satisfied and operating a monitor program to verify a value of a control register or a memory so as to analyze the program.

Conventionally, the execution of the program is interrupted in response to the satisfaction of the preset conditions in the following three approaches.

(1) Break Signal Input System

Figure 7:
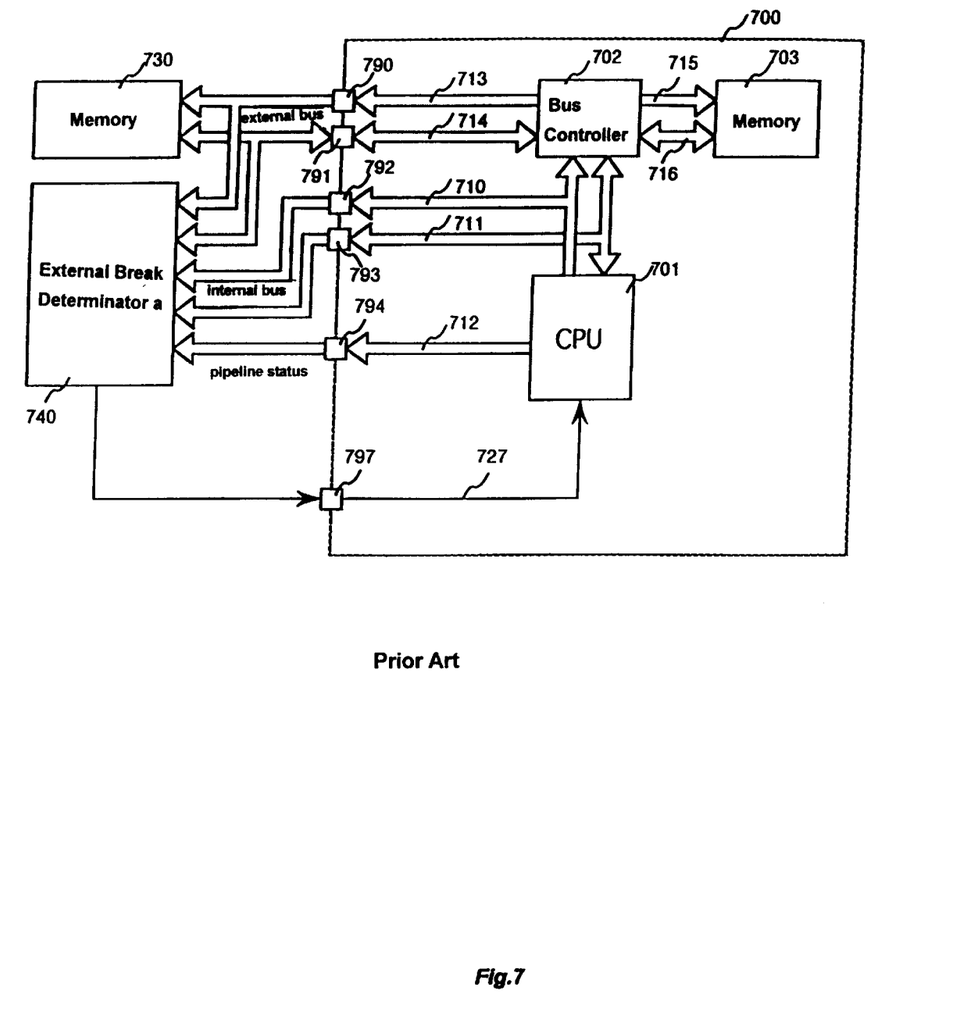
FIG. 7 is a circuit diagram of a conventional debug apparatus in a break signal input system.

This is one of the systems using an external break determinator for control of breaking (interrupting) an execution of the program that should be debugged. FIG. 7 shows the structure of a debug apparatus in this system. An external break determinator a 740 determines whether or not preset conditions are satisfied, based on signals from external buses 713 and 714, internal buses 710 and 711 and a pipeline status 712 of a microprocessor 700, and outputs a break signal 727 to the microprocessor when the preset conditions are satisfied. The microprocessor breaks the execution of the program temporarily in response to the break signal 727, and operates a monitor program so as to analyze the executed program. This system is advantageous in that break conditions can be set flexibly and easily. However, as described later, this system poses a problem that actual halt of program execution is delayed.

(2) Break Hit Signal Output/Break Signal Input System

Figure 9:
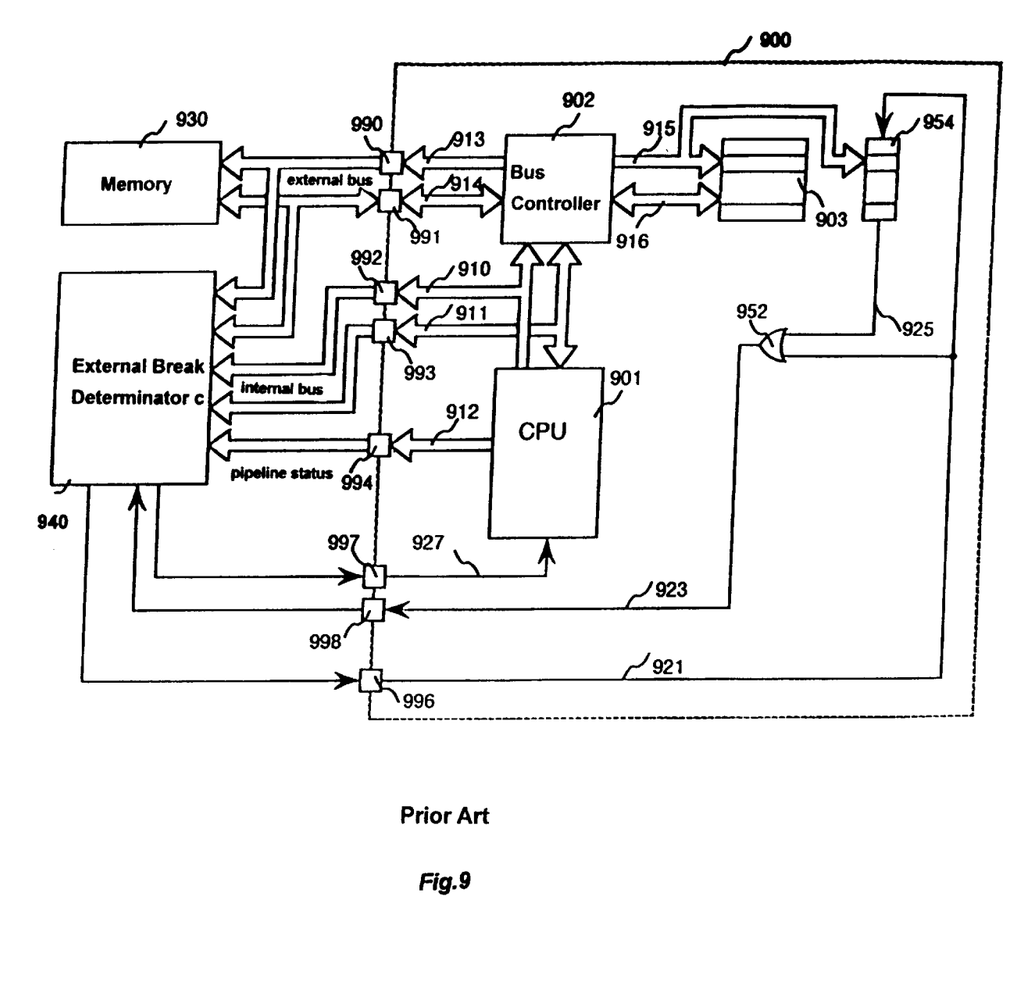
FIG. 9 is a circuit diagram of a conventional debug apparatus in a break hit signal output/break signal input system.

This is also one of the systems using an external break determinator for control of the break of a program that should be debugged. The microprocessor outputs a signal indicating that the break conditions are satisfied (hereinafter, referred to as a break condition match signal), and more complex conditions can be processed in an external break controller, and a break signal is input to a break input terminal of the microprocessor. This system is disclosed in Japanese Laid-Open Patent Publication (Tokkai-Hei) No.04-130930. FIG. 9 shows a microprocessor in this system.

A microprocessor 900 includes an auxiliary bit memory 954 for storing break information bits corresponding to each unit of an internal memory (a cache memory) 903. When data or an instruction is loaded from an external memory 930 to the internal memory 903, a break request signal 921 is output from a conventional external break determinator c 940 so as to set break information in the auxiliary bit memory 954. On the other hand, every time the internal memory is accessed, the break condition match signal 923 is output, and the external break determinator c 940 calculates the results of combining the number of times of satisfaction of a condition and other conditions, based on the break condition match signal 923. The results are input to a break input terminal 997 of the microprocessor. This system allows the break conditions to be set in flexible combinations of the number of times of program execution and other conditions. However, as described later, this system poses a problem that actual halt of program execution is delayed, as in the break signal input system.

(3) Internal Break Controller System

Figure 8:
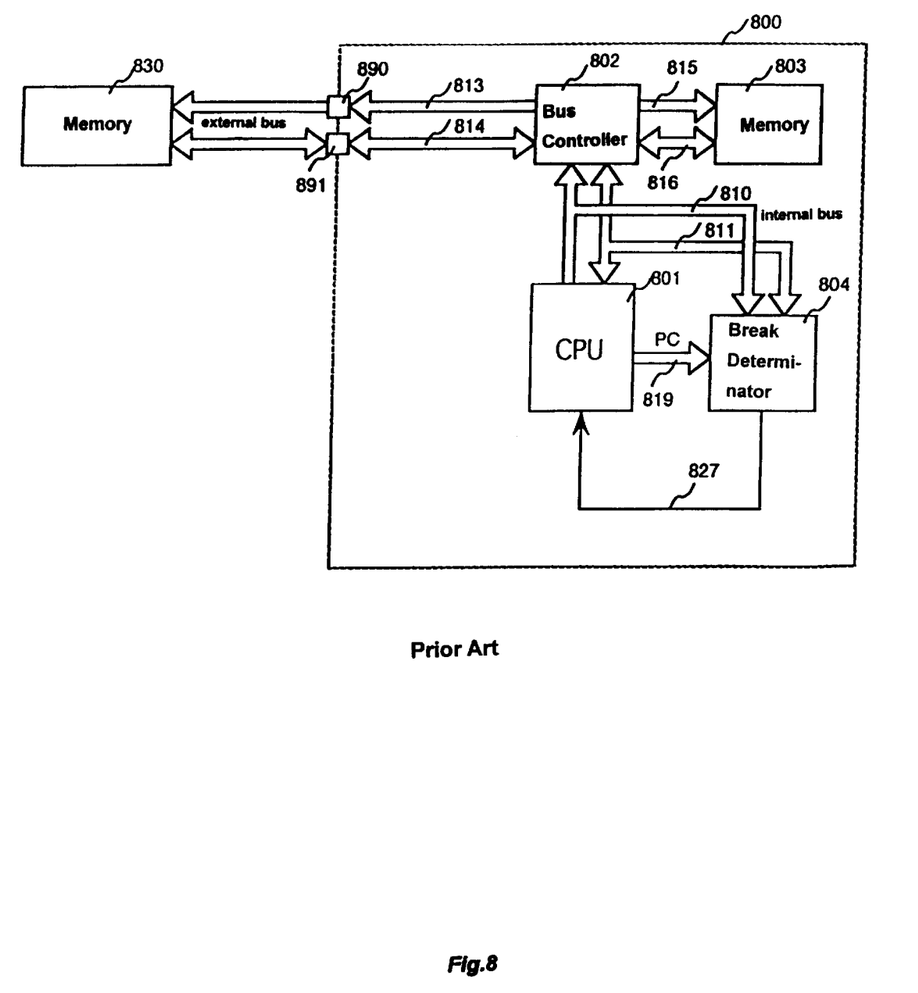
FIG. 8 is a circuit diagram of a conventional debug apparatus in an internal break controller system.

A circuit for determining the satisfaction of break conditions is built in a chip so as to generate a break signal internally. This system is disclosed in, for example, Nikkei Electronics No. 623 "32 bit-one chip microcomputer including all functions of ICE". FIG. 8 shows the structure of a debug apparatus in this system.

A microprocessor 800 includes a break determinator 804 therein. The break determinator 804 keeps track of the current status of a program by monitoring bus cycles of internal buses 810 and 811 and data from an execution address 819, determines whether or not the preset conditions are satisfied, and inputs a break signal 827 to a central processing unit 801 when the break conditions are satisfied. This system is advantageous in that a processing delay is not generated, because break or interruption of program execution is performed in the internal circuit. However, as described later, this system poses a problem of upsizing the circuit in order to set complicated conditions.

In the development of programs for a microprocessor, it is an important issue in debugging to break the execution immediately when the conditions are satisfied and to validate and verify a status of the memory or the register at that time. It is required to minimize a delay from the detection of break conditions to the halt of the program, or to break the program exactly at the point when the conditions are satisfied.

Furthermore, in order to debug a program only at a specific status of execution, it is not sufficient to interrupt the execution of the program when one break condition is satisfied, but it is necessary to set conditions in a complex sequence such as the following types of conditions:

sequential break condition type, under which a program is interrupted when a plurality of conditions are satisfied sequentially, for example, when condition 1 is satisfied and then condition 2 is satisfied;

occurrence times break condition type, under which a program is interrupted when condition 1 occurs n times;

combination break condition type, under which a program is interrupted when conditions in combination of the occurrence times break condition and the sequential break condition are satisfied.

However, an operating clock frequency of a microprocessor increases year after year, so that a delay involving input to the chip and output from the chip has become relatively large.

Figure 10:
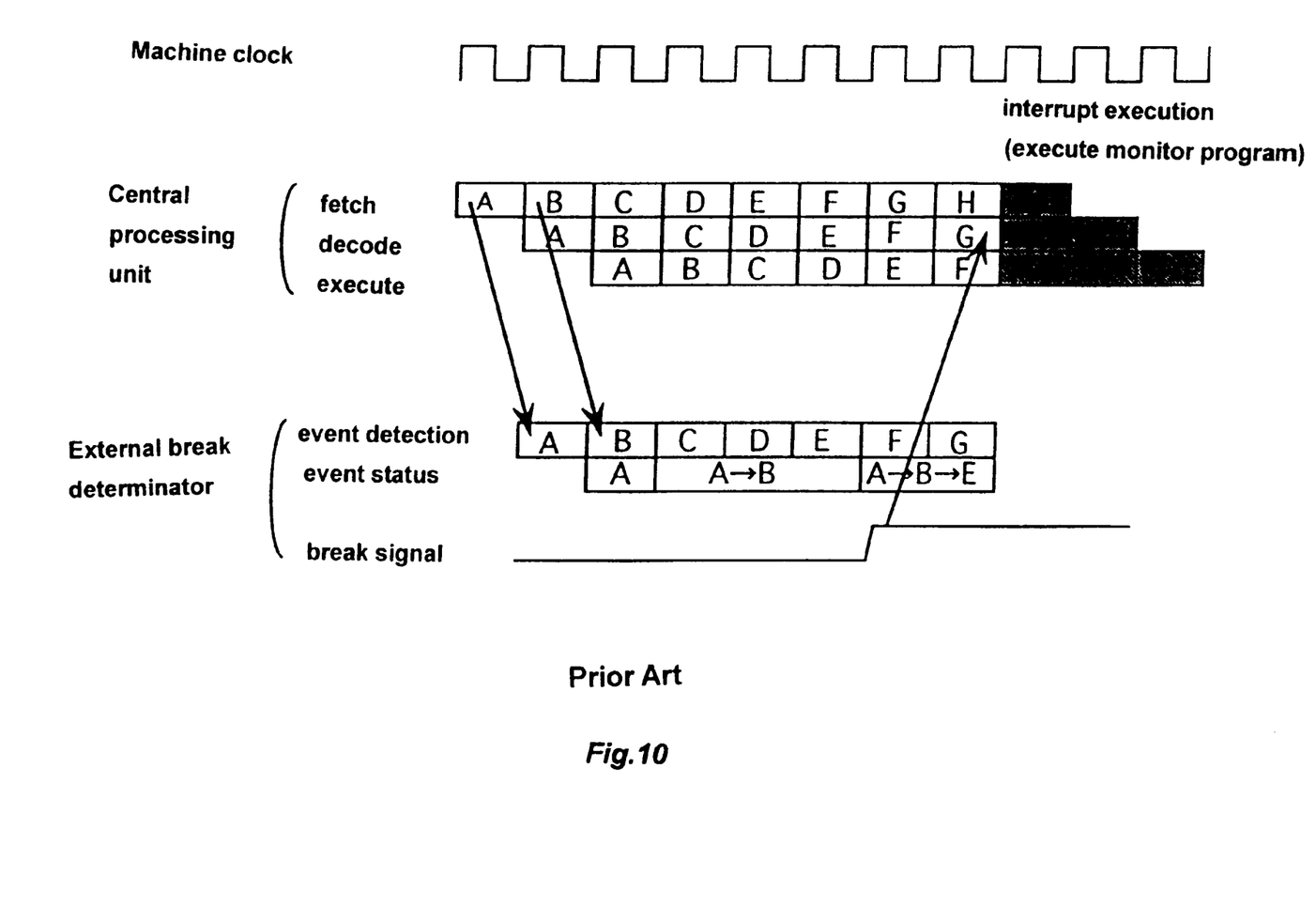
FIG. 10 is a timing chart from detection of break conditions by the conventional debug apparatus.

Therefore, in the conventional examples (1) "break signal input system" and (2) "break hit signal output/break signal input system", the microprocessor actually receives an instruction for interruption several clocks later than a break signal is input to the chip from the external break determinator. Thus, a delay of several clocks is generated, so that break of a program execution does not occur exactly at the preset break conditions. FIG. 10 shows a timing from detection of a break condition to interruption of a program. As shown in FIG. 10, the execution of the program is halted at an execution address G instead of E, at which the execution is desired to be halted, because of a delay required for outputting a signal representing a current status from the chip and a time lag from input of a break signal from the conventional external break determinator to the chip until actual halt of the program.

In the conventional example (3), since the break determinator is included in the chip, the delay time from detection of a break condition to halt of the program can be minimized. However, in order to realize break conditions in a complex sequence, it is necessary to upsize the circuit, thus requiring a large chip area. Therefore, when a circuit is required to be mounted in a limited area, only simple break conditions can be set.

SUMMARY OF THE INVENTION

Therefore, with the foregoing in mind, it is an object of the present invention to provide a debug apparatus that minimizes a delay from the detection of break events in break conditions in a complex sequence to the interruption of the program, even if the operation frequency of the microprocessor is increased, and that includes a debug function with a minimized necessary break determinator included in the chip.

A debug apparatus for breaking execution of a program of a microprocessor when a plurality of conditions are satisfied of the present invention comprises a microprocessor and a debug control element provided outside the microprocessor. The debug control element includes an external break determinator for outputting a break enable signal when a part of the conditions is satisfied. The microprocessor includes a break determinator for outputting a break condition match signal when remaining conditions other than the part of the conditions are satisfied, and an AND logic circuit for receiving the break enable signal and the break condition match signal so as to output a break signal.

According to another aspect of the present invention, a microprocessor for breaking execution of a program when a plurality of conditions are satisfied receives a break enable signal indicating that a part of the conditions are satisfied as an external input. The microprocessor includes a break determinator for outputting a break condition match signal when remaining conditions other than the part of the conditions are satisfied and an AND logic circuit for receiving the break enable signal and the break condition match signal so as to output a break signal.

According to another aspect of the present invention, a debug control element for breaking execution of a program of a microprocessor when a plurality of conditions are satisfied includes an external break determinator for outputting a break enable signal indicating that a part of the conditions are satisfied to the microprocessor.

Thus, since the external break determinator detects a part of the break conditions of sequential break conditions, it is unnecessary to include a circuit for determining complex conditions within the chip, thus minimizing the size of the break determinator included in the chip. Moreover, a time lag from the detection of break conditions to the break of a program can be minimized to an extent of a delay occurring in the chip.

In one embodiment of the present invention, the conditions are a plurality of sequential break conditions. It is preferable that the part of the conditions corresponds to all the sequential break conditions except a condition in the final stage, and that the remaining condition corresponds to the condition in the final stage of the sequential break conditions.

This embodiment makes it possible to set complex sequential break conditions in the stages prior to the final stage in the external circuit flexibly and allows the condition in the final stage to be included in the processor, thereby realizing condition break without delay.

In another embodiment, the debug apparatus further includes a pull-up resistance in an input line of the break enable signal of the AND logic circuit. Thus, the input of the break enable signal of the AND logic circuit can be fixed and stored. This embodiment makes it possible to set only the break condition in the final stage in the internal break determinator by fixing the input signal from an external break determinator to the AND logic circuit without performing a process externally, when the break condition for program debugging is simple.

In still another embodiment of the present invention, means for storing the remaining conditions other than the part of the conditions is a break condition register, and means for outputting the break signal is a comparator for receiving an output value from the break condition register and a current status of the monitored microprocessor. This embodiment makes it possible to output a break condition match signal when a current a status matches either of a preset execution address value, internal address value, and internal data bus value so as to break an execution of a program.

In yet another embodiment of the debug apparatus of the present invention, the external break determinator further includes means for inputting the remaining conditions other than the part of the conditions to the break determinator in the microprocessor. This embodiment makes it possible to write the break condition in the internal break determinator, thus facilitating setting and rewriting the break conditions during debug. The setting of break conditions is changed depending on a detected status of the break conditions so that a greater number of break conditions than the number of comparators can be processed for detection of condition match.

In another embodiment of the debug apparatus of the present invention, the break determinator includes a break information storage area for storing a break request signal corresponding to every internal memory unit as break information. The external break determinator includes means for writing the break information to the break information storage area. When the internal memory is accessed, corresponding break information in the break information storage area is output as the break condition match signal. This embodiment makes it possible to set break conditions concerning instruction fetch and memory access to the internal memory in a plurality of points, and combine complex break conditions such as sequential break conditions generated in the external determinator so as to break execution of a program.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples with reference to FIGS. 1 to 6.

EXAMPLE 1

Figure 1:
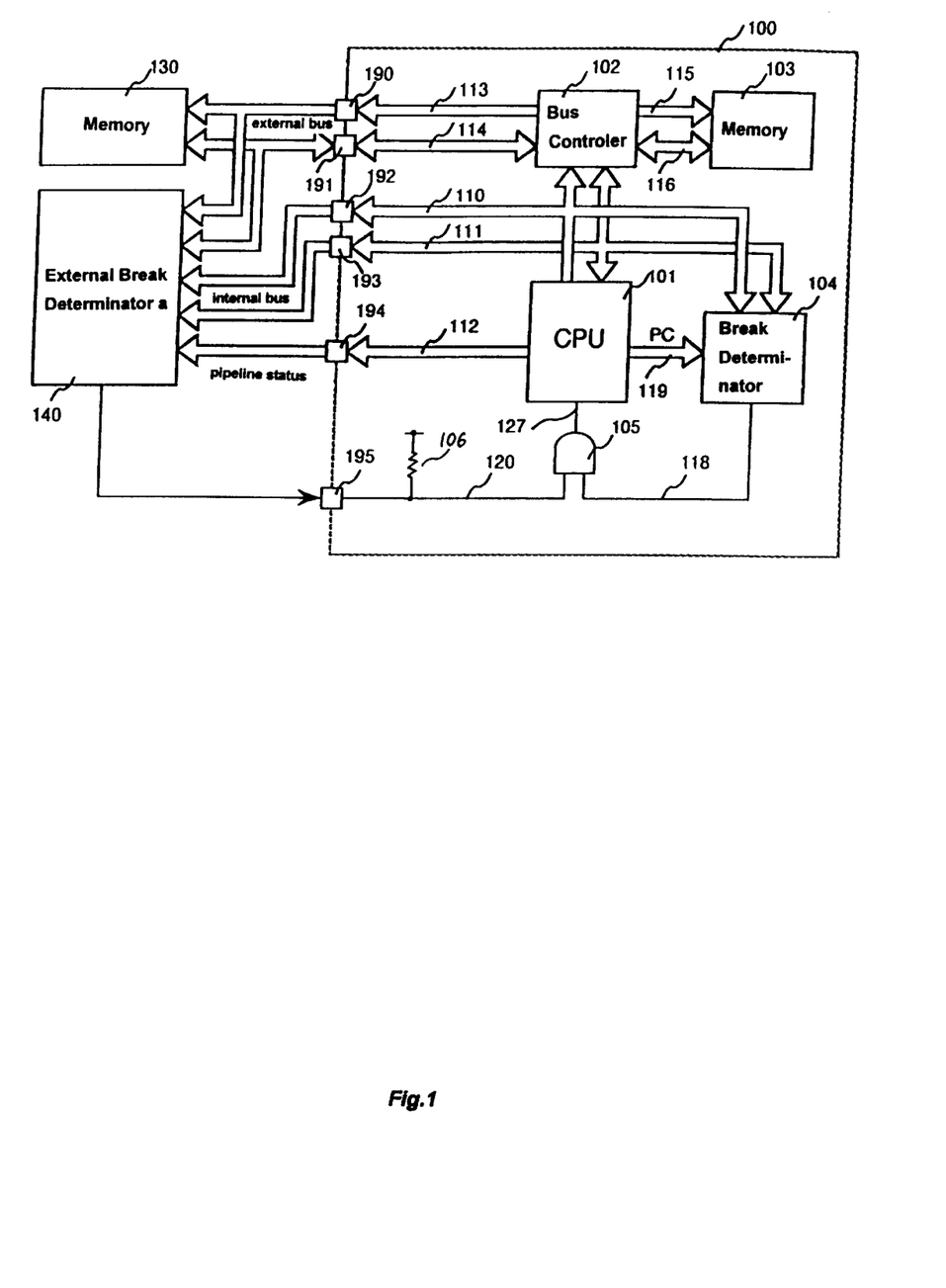
FIG. 1 is a circuit diagram of a debug apparatus according to Example 1 of the present invention.

FIG. 1 is a circuit diagram of a debug apparatus according to Example 1 of the present invention. In FIG. 1, the debug apparatus includes a microprocessor 100, an external break determinator 140, and an external memory 130. The microprocessor 100 includes a central processing unit (CPU) 101, a bus controller 102, an internal memory 103, a break determinator 104, an AND logic circuit 105, and a pull-up resistance 106. Input/output nodes 190 to 195 act as input/output interfaces between the microprocessor 100 and the external break determinator 140 and the external memory 130. Internal buses and signals in the debug apparatus are denoted by 110 to 120 and 127.

The break determinator 104 receives an execution address 119 from the CPU 101 and data from an internal address bus 110 and an internal data bus 111, and determines whether or not those data match conditions for break. When the data match the break conditions, the break determinator 104 outputs a signal indicating that the data have matched the break conditions (hereinafter, referred to as a break condition match signal) 118. An AND logic circuit 105 outputs an AND output signal of the break condition match signal 118 and a break enable signal 120 from an external break determinator a 140 to the CPU 101. The break enable signal 120 and the AND logic circuit 105 mask the input signal of the break condition match signal 118 to the CPU.

Figure 6:
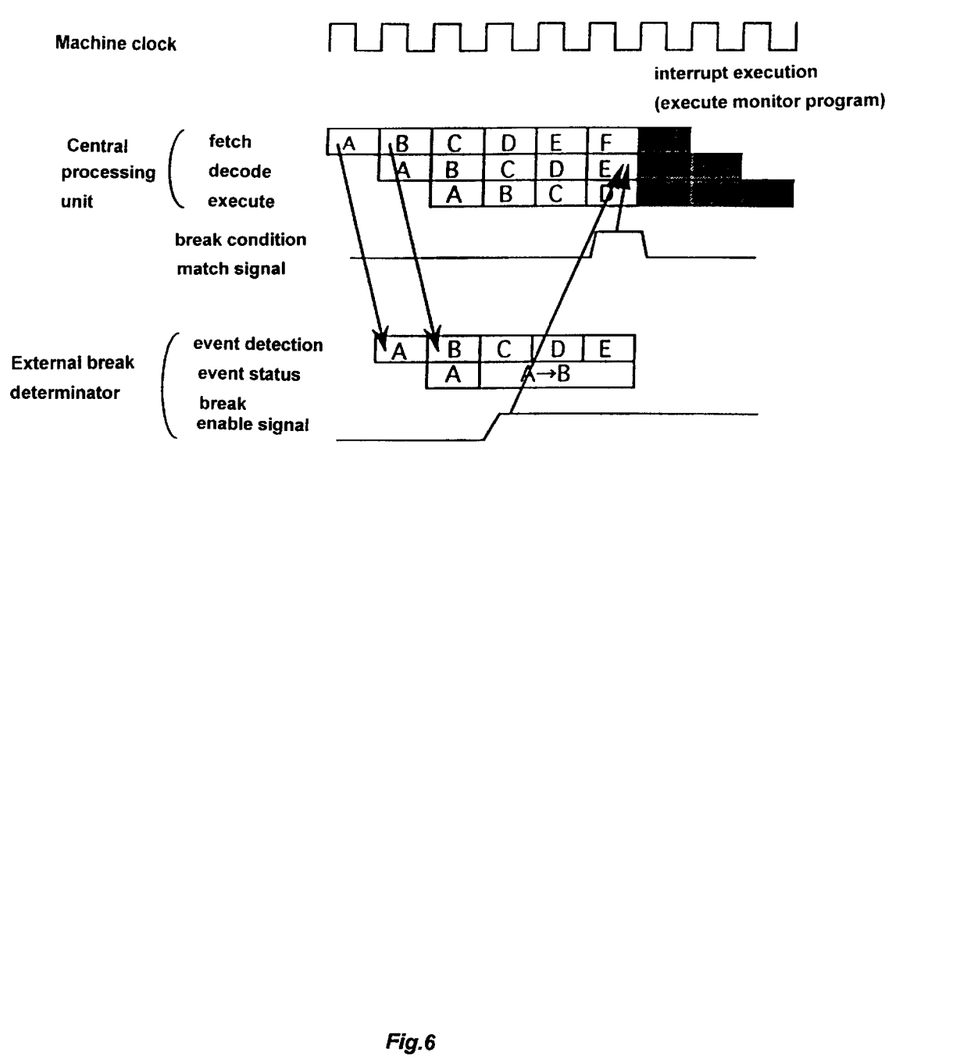
FIG. 6 is a timing chart from detection of break conditions by the debug apparatus of the present invention.

In the debug apparatus according to Example 1, when the external break determinator a 140 detects that all the break conditions except one more condition are satisfied, the external break determinator a 140 supplies a break enable signal to the AND logic circuit 105, thereby enabling output of the break signal to the CPU 101. The internal break determinator 104 detects the final event that completes the satisfaction of all break conditions, and allows the CPU 101 to break the program immediately without delay. A pull-up resistance 106 only drives an input value level to be in an enable status in a weak manner, and does not inhibit the function of the break enable signal 120 in this example. FIG. 6 shows an operation timing of an operation example of the debug apparatus of the present invention. In this case, sequential break conditions are set. More specifically, it is assumed that when the execution address shifts from A to B and then E, the program is interrupted. A code fetched by the CPU 101 is input to the external break determinator a 140 via internal bus output terminals 192 and 193, and the pipeline transition status of the fetched code is input to the external break determinator a 140 via a pipeline status output terminal 194, and an execution address event in the CPU 101 is detected. As shown in FIG. 6, in the CPU, codes A, B, C, D and E are executed in this order. Upon detection of events of A and B in this order, the eternal break determinator a 140 outputs the break enable signal 120 to the AND logic circuit 105 so that the break signal input is enabled. Immediately after the internal break determinator 104 detects an event of E, the internal break determinator 104 outputs the break condition match signal 118, so that a break signal 127 is input to the CPU 101 via the AND logic circuit 105, thereby interrupting the execution of the program in a decoding stage.

Figure 3:
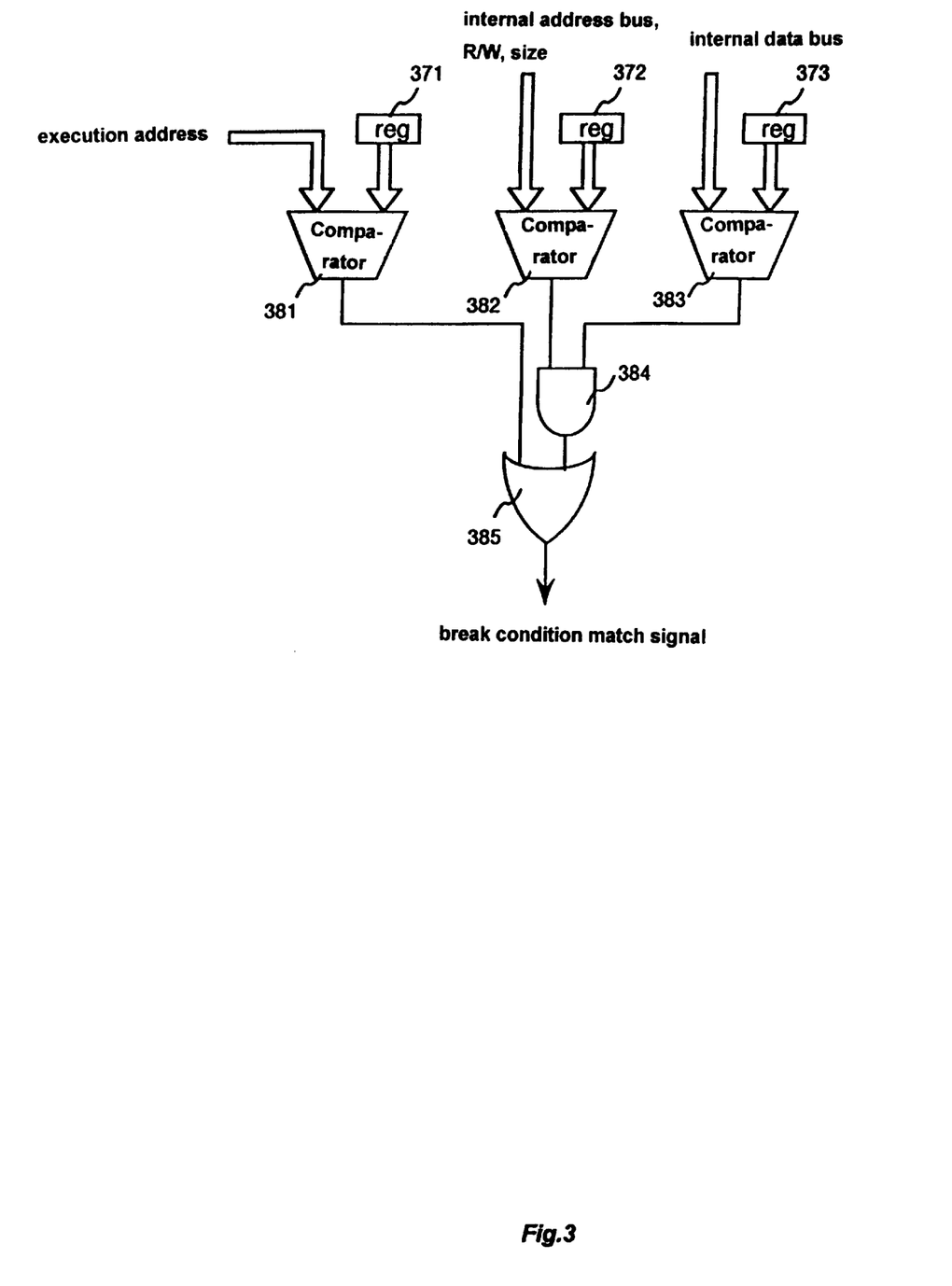
FIG. 3 is a block diagram of a break determinator of the present invention.

FIG. 3 is a block diagram of the internal break determinator of the present invention. This break determinator sets one condition for break of the execution of the program and stores the condition as the final stage in complex conditions for debugging. In FIG. 3, addresses and data of break conditions are stored in an execution address register 371, an internal address bus register 372, and an internal data bus register 373. During program debugging, the break determinator captures execution addresses of the CPU, internal address buses and internal data buses to comparators 381, 382 and 383, respectively. The comparators compare the stored break conditions with the captured execution addresses, internal address buses and internal data buses. An AND logic circuit 384 produces an AND output signal of the address condition and the data condition of the internal bus, and generates a break condition match signal in a specific bus status. Furthermore, an OR logic circuit 385 produces an OR output signal of an output as a result of comparison of the execution address and an output as a result of comparison of the internal bus address/data, and outputs a break condition match signal when either of the conditions is satisfied.

The external break determinator and the internal break determinator with the above-described structure make it possible to set complex break conditions flexibly and to break a program without delay when the break conditions are satisfied. This can provide an environment where a program is debugged more flexibly and efficiently.

EXAMPLE 2

Figure 2:
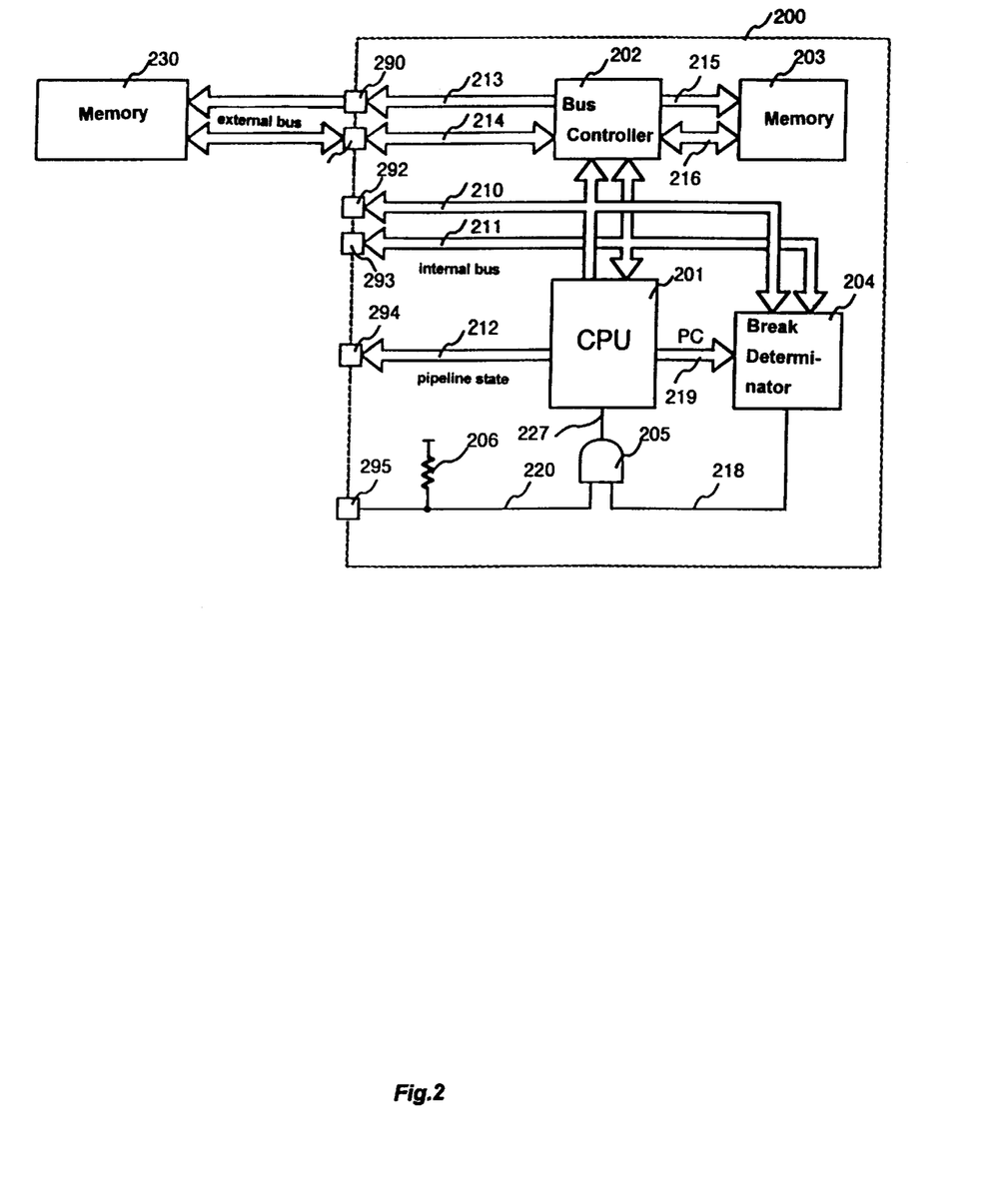
FIG. 2 is a circuit diagram of a debug apparatus according to Example 2 of the present invention.

FIG. 2 is a circuit diagram of a debug apparatus according to Example 2 of the present invention. The circuit in Example 2 is a modification of the circuit in Example 1. In some cases, a program is debugged by setting relatively simple break conditions that can be set only by an internal break determinator. Example 2 provides a simple and reliable circuit configuration for a such case.

In FIG. 2, a microprocessor 200 includes a CPU 201, a bus controller 202, an internal memory 203, a break determinator 204, an AND logic circuit 205, and a pull-up resistance 206. Input/output nodes 290 to 295 act as input/output interfaces with external elements. Internal buses and signals in the debug apparatus are denoted by 210 to 220 and 227. An external memory is provided outside the microprocessor.

The pull-up resistance 206 serves to fix one input 220 of an AND logic circuit 205 to be high. When the break conditions are relatively simple so that no external break determinator as described in Example 1 is required, a CPU 201 sets an execution address 219 of a condition in a break determinator 204. Since the pull-up resistance 206 is connected, a break enable signal 220 of the AND logic circuit 205 is constantly high. When the break determinator 204 detects that the condition is satisfied and outputs a signal, a signal for breaking a program is input to the CPU via the AND logic circuit 205, thus breaking the program immediately.

When the logic of the break enable is negative logic, the use of a pull-down resistance makes it possible to fix the break enable signal 220 to be active.

The above-described structure can provide a more simple and reliable debug environment without performing a process via the external break determinator when break conditions for program debugging are simple.

EXAMPLE 3

Figure 4:
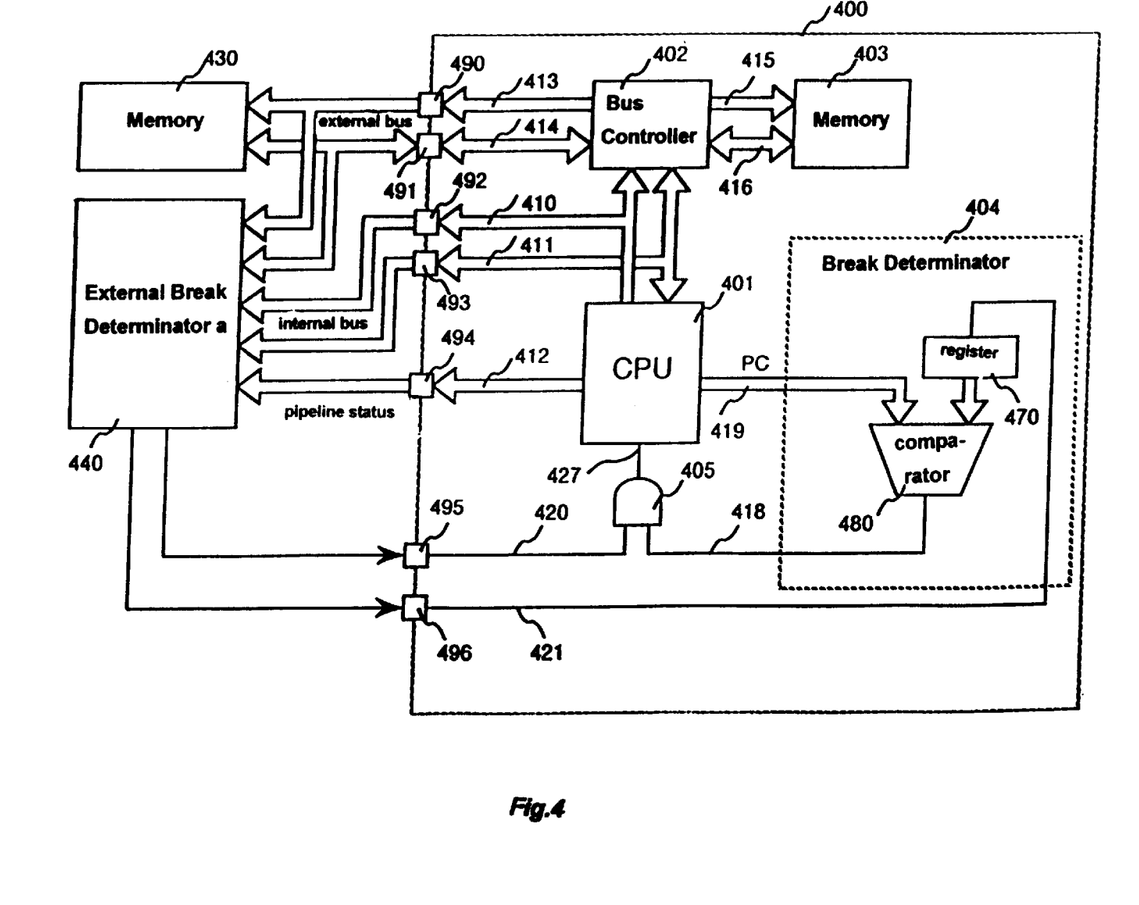
FIG. 4 is a circuit diagram of a debug apparatus according to Example 3 of the present invention.

FIG. 4 is a circuit diagram of a debug apparatus of Example 3 of the present invention. The debug apparatus in Example 3 is a modification of that of Example 1.

In FIG. 4, the debug apparatus includes a microprocessor 400, an external break determinator 440, and an external memory 430. The microprocessor 400 includes a CPU 401, a bus controller 402, an internal memory 403, a break determinator 404, and an AND logic circuit 405. The microprocessor 400 is connected to the external break determinator 440 and the external memory 430 via input/output nodes 490 to 496. Internal buses and signals in the debug apparatus are denoted by 410 to 421 and 427. The break determinator 404 includes a register 470 and a comparator 480.

The basic configurations and operations of the external break determinator 440, the break determinator 404, and the AND logic circuit 405 are the same as those of the external break determinator 140, the break determinator 104, and the AND logic circuit 105 described in Example 1. The break condition register 470 is constituted by a loadable flip-flop and receives a break condition setting signal 421 from an external break determinator a 440 via a break condition setting input terminal 496.

This structure makes it possible to set complex break conditions in the external break determinator and to write the final stage of the break conditions in the internal break determinator 404, thereby facilitating the setting and rewriting of the break conditions during debugging.

EXAMPLE 4

Figure 5:
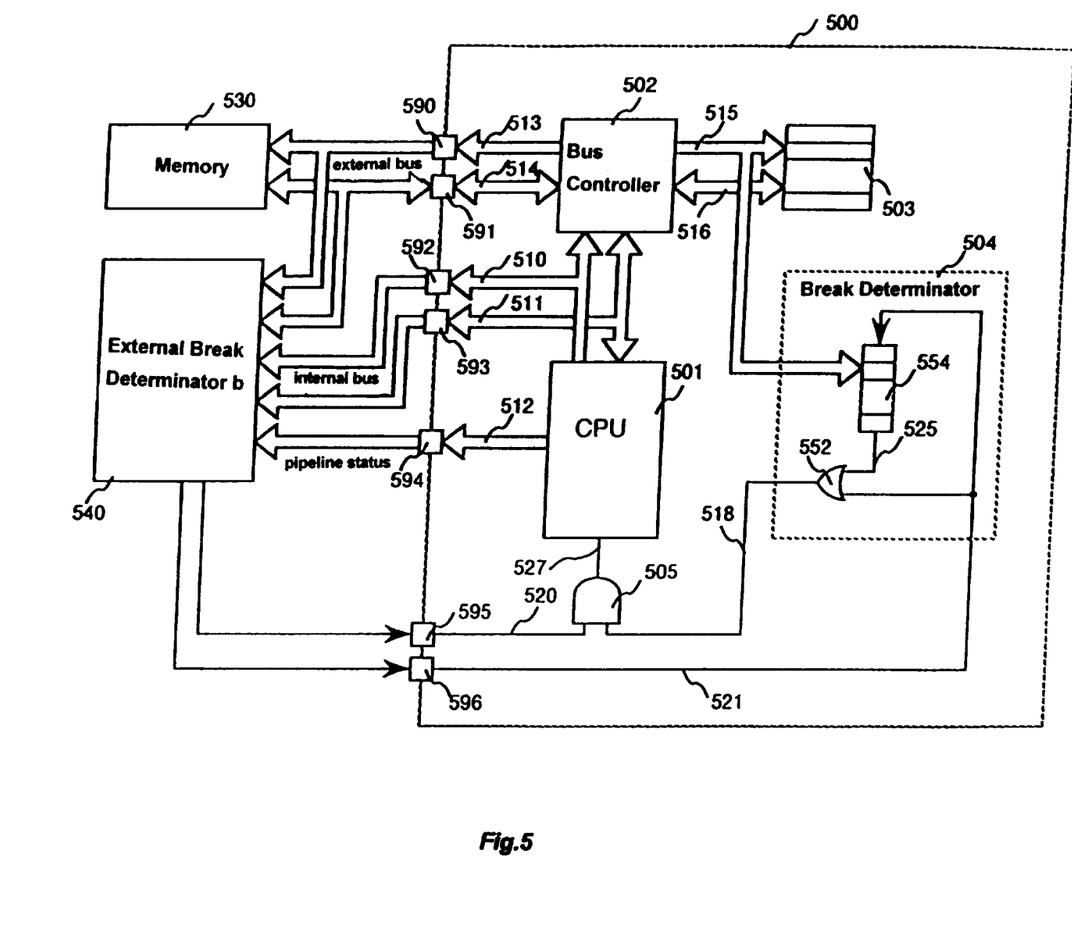
FIG. 5 is a circuit diagram of a debug apparatus according to Example 4 of the present invention.

FIG. 5 is a circuit diagram of a debug apparatus of Example 4 of the present invention.

In FIG. 5, the debug apparatus includes a microprocessor 500, an external break determinator 540 and an external memory 530. The microprocessor 500 includes a CPU 501, a bus controller 502, an internal memory 503, a break determinator 504, and an AND logic circuit 505. Input/output nodes 590 to 596 word as input/output interfaces between the microprocessor 500 and the external break determinator 540 and the external memory 530. Internal buses and signals in the debug apparatus are denoted by 510 to 520 and 527. The break determinator 504 includes a break information memory 554 and an OR logic circuit 552.

The break information corresponding to an internal memory unit is stored in a break information memory 554, and every time the same memory unit is accessed, the break information stored in the break information memory 554 is output to an AND logic circuit 505. More specifically, when an instruction or data are loaded to a main memory or a cache memory 503 in an address specified by an internal memory address bus 515, the external break determinator b 540 outputs a break condition setting signal to the break information memory 554 via a break condition setting signal input terminal 596. Thus, break information of the final break condition is set in the break information memory 554. Then, execution of a program proceeds, and when the external break determinator b 540 determines that all break conditions except one more condition are satisfied, the external break determinator b 540 outputs a break enable signal 520 to the AND logic circuit 505. Then, every time the memory 503 is accessed, the corresponding break information stored in the break information memory 554 is output to the AND logic circuit 505. An OR logic circuit 552 generates a break condition match signal 518 by OR output of the break condition setting signal of the external break condition circuit b and an output from the break information memory 554.

In the description above, the logic function is constituted by an AND logic circuit and an OR logic circuit, but other logic circuits can be used instead, as long as the same logic function can be realized. Regarding a comparator, other types of comparators such as a comparator that masks specific bits can be used, as long as the comparison can be performed in the same basic manner. Furthermore, the break condition register is constituted by a loadable flip-flop in the present invention, but it can be constituted by a latch or a shift register.

The debug apparatus of the present invention makes it possible to minimize a circuit area by downsizing a break determinator included in a chip, even when complex break conditions are required to be satisfied, and to minimize a time lag from detection of the break conditions to break of the execution of the program to a internal delay time within the chip.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A debug apparatus for breaking execution of a program of a microprocessor when a plurality of conditions are satisfied, comprising a microprocessor and a debug control element provided outside the microprocessor, wherein the conditions are a plurality of sequential break conditions, the debug control element includes an external break determinator for outputting a break enable signal when a part of the sequential break conditions are satisfied, and the microprocessor includes a break determinator for outputting a break condition match signal when remaining sequential break conditions other than said part of the sequential break conditions of the external break determinator are satisfied, and an AND logic circuit for receiving the break enable signal and the break condition match signal so as to output a break signal.

2. A microprocessor for breaking execution of a program when a plurality of conditions are satisfied, wherein the conditions are a plurality of sequential break conditions, the microprocessor receives a break enable signal indicating that a part of the sequential break conditions are satisfied as an external input, the microprocessor having a break determinator for outputting a break condition match signal when remaining sequential break conditions other than the part of said sequential break conditions are satisfied and an AND logic circuit for receiving the break enable signal and the break condition match signal so as to output a break signal.

3. A debug control element for breaking execution of a program of a microprocessor when a plurality of conditions are satisfied, the conditions are a plurality of sequential break conditions, the debug control element comprising an external break determinator for outputting a break enable signal indicating that a part of the sequential break conditions are satisfied to the microprocessor.

4. A debug apparatus for breaking execution of a program of a microprocessor when a plurality of conditions are satisfied, comprising:

a microprocessor and a debug control element provided outside the microprocessor, wherein the conditions are a plurality of sequential break conditions, the debug control element includes an external break determinator for outputting a break enable signal when a part of the sequential break conditions corresponding to all the sequential break conditions except a condition in the final stage are satisfied, and the microprocessor includes a break determinator for outputting a break condition match signal when remaining sequential break conditions corresponding to the condition in the final stage of the sequential break conditions of the external break determinator are satisfied, and an AND logic circuit for receiving the break enable signal and the break condition match signal so as to output a break signal.

5. A microprocessor for breaking execution of a program when a plurality of conditions are satisfied, including a debug control element provided outside the microprocessor, wherein the conditions are a plurality of sequential break conditions, the debug control element includes an external break determinator for outputting a break enable signal when a part of the sequential break conditions corresponding to all the sequential break conditions except a condition in the final stage are satisfied, and the microprocessor includes a break determinator for outputting a break condition match signal when remaining sequential break conditions corresponding to the condition in the final stage of the sequential break conditions of the external break determinator are satisfied, and an AND logic circuit for receiving the break enable signal and the break condition match signal so as to output a break signal.

6. A debug control element for breaking execution of a program of a microprocessor when a plurality of conditions are satisfied, the debug control element is provided outside a microprocessor, wherein the conditions are a plurality of sequential break conditions, the debug control element includes an external break determinator for outputting a break enable signal when a part of the sequential break conditions correspond to all the sequential break conditions except a condition in the final stage are satisfied, and the microprocessor includes a break determinator for outputting a break condition match signal when remaining sequential break conditions corresponding to the condition in the final stage of the sequential break conditions of the external break determinator are satisfied, and an AND logic circuit for receiving the break enable signal and the break condition match signal so as to output a break signal.

7. The debug apparatus according to claim 1, further comprising a pull-up resistance in an input line of the break enable signal of the AND logic circuit.

8. A debug apparatus for breaking execution of a program of a microprocessor when a plurality of conditions are satisfied, comprising:

a microprocessor and a debug control element provided outside the microprocessor, wherein the debug control element includes an external break determinator for outputting a break enable signal when a part of the conditions are satisfied, and the microprocessor includes a break determinator for outputting a break condition match signal when a remaining condition other than the part of the conditions of the external break determinator are satisfied, an AND logic circuit for receiving the break enable signal and the break condition match signal so as to output a break signal, a break condition register for storing the remaining condition other than the part of the conditions, and a comparator for receiving an output value from the break condition register and a current status of the monitored processor and outputting the break signal.

9. A debug apparatus for breaking execution of a program of a microprocessor when a plurality of conditions are satisfied, comprising:

a microprocessor and a debug control element provided outside the microprocessor, wherein the debug control element includes an external break determinator for outputting a break enable signal when a part of the conditions are satisfied, and the microprocessor includes a break determinator for outputting a break condition match signal when a remaining condition other than the part of the conditions of the external break determinator are satisfied, an AND logic circuit for receiving the break enable signal and the break condition match signal so as to output a break signal, the external break determinator further includes a remaining condition inputting part for inputting the remaining condition other than the part of the conditions to the break determinator in the microprocessor.

10. The debug apparatus according to claim 1, wherein the break determinator includes a break information storage area for storing a break request signal corresponding to every internal memory unit as break information, the external break determinator includes means for writing the break information to the break information storage area, and when the internal memory is accessed, corresponding break information in the break information storage area is output as the break condition match signal.

* * * * *